United States Patent
Laiou et al.

(10) Patent No.: US 7,933,709 B2
(45) Date of Patent: Apr. 26, 2011

(54) METHOD FOR CONTROLLING SPEED AND/OR DISTANCE IN MOTOR VEHICLES

(75) Inventors: Maria-Christina Laiou, München (DE); Alexander Meske, München (DE); Falk Langer, Marienberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/470,144

(22) Filed: May 21, 2009

(65) Prior Publication Data
US 2009/0228185 A1 Sep. 10, 2009

Related U.S. Application Data

(63) Continuation of application No. PCT/EP2007/009873, filed on Nov. 15, 2007.

(30) Foreign Application Priority Data

Nov. 30, 2006 (DE) .................. 10 2006 056 629

(51) Int. Cl.
*B60T 7/12* (2006.01)

(52) U.S. Cl. ........................................................ 701/96
(58) Field of Classification Search .................... 701/93, 701/95, 96, 97; 180/170
See application file for complete search history.

(56) References Cited

U.S. PATENT DOCUMENTS

| | | | |
|---|---|---|---|
| 6,493,625 B2 | 12/2002 | Andreas et al. | |
| 6,600,986 B2 | 7/2003 | Steinle et al. | |
| 2002/0165657 A1 | 11/2002 | Winner et al. | |
| 2003/0234127 A1* | 12/2003 | Sudou et al. | .................. 180/170 |
| 2005/0240335 A1 | 10/2005 | Schroder | |

* cited by examiner

*Primary Examiner* — Kim T Nguyen
(74) *Attorney, Agent, or Firm* — Barley Snyder LLC

(57) ABSTRACT

The invention relates to a method for controlling speed and/or distance in motor vehicles having distance-related longitudinal control systems, wherein during clear driving, a clear drive acceleration value is set to reach a preset speed, and while following a detected target object, a following acceleration value is set to maintain a preset distance from the target object, and wherein if the target object is lost during a following drive operation, a transition acceleration value is set. According to the invention, the transition acceleration value is set for the duration of a time interval, which is dependent on the speed at the time of the target object loss.

13 Claims, 1 Drawing Sheet

METHOD FOR CONTROLLING SPEED AND/OR DISTANCE IN MOTOR VEHICLES

CROSS-REFERENCE TO RELATED APPLICATIONS

This application claims the benefit of the filing date under 35 U.S.C. §119(a)-(d) of International Patent Application No.: PCT/EP2007/009873 filed Nov. 15, 2007, which claims the priority of German Patent Application No. DE 10 2006 056 629.7 filed on Nov. 30, 2006.

FIELD OF THE INVENTION

The invention relates to a method for controlling speed and/or distance in motor vehicles having distance-related longitudinal control systems.

BACKGROUND

Motor vehicles having longitudinal control systems are well known. Most of the currently available longitudinal control systems control the speed of the motor vehicle by setting an acceleration value at a preset desired or theoretical speed. Additionally, longitudinal control systems enhanced by distance control, which are known as distance-related longitudinal control systems, are also obtainable today from some manufacturers. Such systems, offered, for example by BMW, the Assignee of the present invention, under the name of "Active Cruise Control", make it possible to automatically drive the motor vehicle while maintaining a desired distance from the vehicle ahead, at a desired speed or at an appropriately slower speed. In principle, the generally known longitudinal control or vehicle speed control systems, which maintain a specific predetermined speed, are enhanced by an additional distance function, such that the use of an "active" driving speed control of this type is also possible in heavy motorway and non-motorway road traffic. The system is therefore generally able to adjust the vehicle's speed to suit the surrounding traffic conditions.

The Active Cruise Control System maintains a desired or set speed when the driver's lane is clear. Under the clear lane condition, a clear drive acceleration value is set. A distance sensor system on the motor vehicle, operating, for example, with a radar, detects a target object or vehicle ahead in the host vehicle's lane. The speed of the host vehicle is adjusted, by the system, to the speed of the motor vehicle or target object ahead, for example, by initiating a suitable following acceleration value, such that a distance control contained in the Active Cruise Control System or in the corresponding longitudinal control system automatically maintains a preset distance, appropriate for the situation, from the motor vehicle or target object ahead. Distance-controlled longitudinal control systems of this type are generally only active or operable beyond a minimum speed of, for example 30 km/h. However, these systems can be enhanced by a "stop-and-go function", such that distance-related longitudinal control is possible up to and out of standstill.

If, during the control process, at a preset distance from a target object ahead at relatively high speeds, the loss of a target object is detected, the distance-related longitudinal control systems are generally configured such that they immediately switch over from follow control operation into clear drive control (i.e. into the control made for reaching the preset speed). However, this is a problem when the detected loss of the target object is only temporary, because the target object ahead is travelling around a bend, or the loss of the target object is detected due to a sensor error.

DE 100 47 746 A1 discloses a method for distance-related longitudinal control in which, following the loss of a target object and using the information of a navigation system, a probability of the vehicle or target object ahead and/or of the host motor vehicle travelling around a bend is determined. If the determined probability exceeds a predetermined threshold, a time-delayed clear drive acceleration to the preset speed is carried out.

DE 100 06 403 A1 discloses a method for controlling speed and distance in which, and in the event of losing a target object, a transition acceleration value is calculated. Therefore, the vehicle's speed would be a function of the speed of the target object before it was lost, of the driving speed of the motor vehicle and of the distance from the original target object until a new target object is detected. Additionally, the vehicle's speed could be a function until the motor vehicle has reached the location where the target object was lost. From this time, either the usual control following the new target object starts or a clear drive control starts.

A problem exists in reproducing controllable vehicle behaviour when a target object has been detected as being lost at low speeds (stop-and-go) and with resulting very short distances from the original target objects. Attempts to address this problem, in the event of the loss of a target object at very low speeds, for example below 30 km/h, have the entire distance-related longitudinal control system switched off.

SUMMARY

An object of the invention, among others, is to provide an improved method, which is particularly suitable for use in stop-and-go operation, for controlling speed and distance when a loss of a target object is detected. This and other objectives are achieved through a method for controlling speed and/or distance in motor vehicles having distance-related longitudinal control systems, wherein during clear driving, a clear drive acceleration value is set for reaching a preset speed, and during driving following a detected target object, a follow drive acceleration value is set for maintaining a preset distance from the target object, and wherein if the target object is lost during follow drive operation, a transition acceleration value is set, wherein the transition acceleration value is set for the duration of a time interval which is dependent on the speed at the time of the target object loss.

BRIEF DESCRIPTION OF THE DRAWINGS

The invention will now be described in detail with reference to an embodiment.

DETAILED DESCRIPTION OF THE EMBODIMENT(S)

Figure 1:
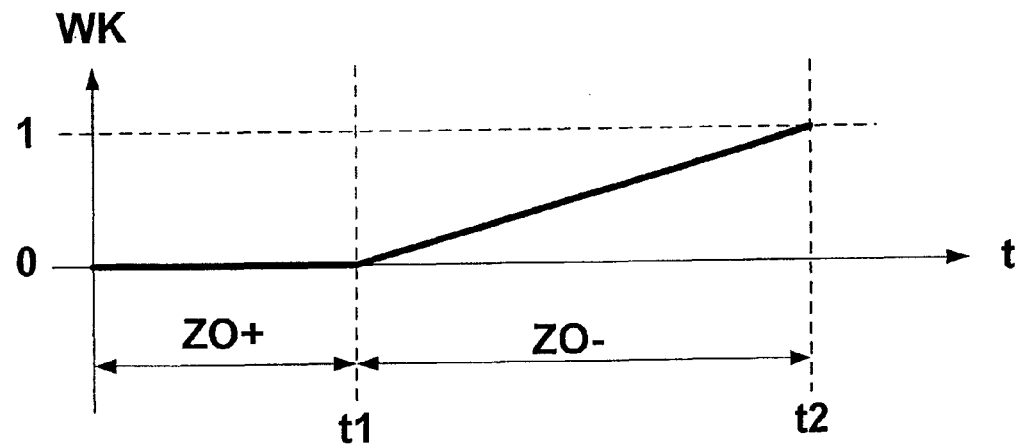
FIG. 1 shows a probability of a target object loss determined and plotted over time, within a speed-dependent time interval.

FIG. 1 shows a diagram in which the determined target object loss probability WK is plotted over the time t. The target object loss probability WK indicates the likelihood that a target object is actually no longer in front of the motor vehicle.

From the start of the time t until a time t1, using suitable sensors, a target object is detected and denoted in this case by ZO+. Within this time range, the target object loss probability WK is 0, since no target object loss has been detected. As long as the target object is detected, no target object loss probability WK is determined.

At time t1, the loss of the target object is detected, denoted here by ZO−. As a function of the actual speed of the motor vehicle, at the time t1 of the target object loss, a time interval from t1 to t2 is then set, within which the target object loss probability WK is determined. At the start of the detected target object loss period ZO−, i.e. shortly after the time t1, it is assumed that the loss is just based on incorrect information, for example on a defective sensor signal. Thus, the target object loss probability WK is zero 0 or almost zero 0.

As time t passes, from the start of the detected target object loss period ZO−, the target object probability WK increases. If, up to the speed-dependent time t2, no target object is (again) detected, the target object loss probability WK increases continuously until it assumes the value 1 by time t2. The target object loss probability WK increases as a function of the time t, in that, at t1 of target object loss, the target object loss probability WK increases from 0 to 1. The slope of this function is derived from the speed of the motor vehicle at the time t1 of the target object loss, as this is the basis for the length of the time interval from t1 to t2.

Figure 2:
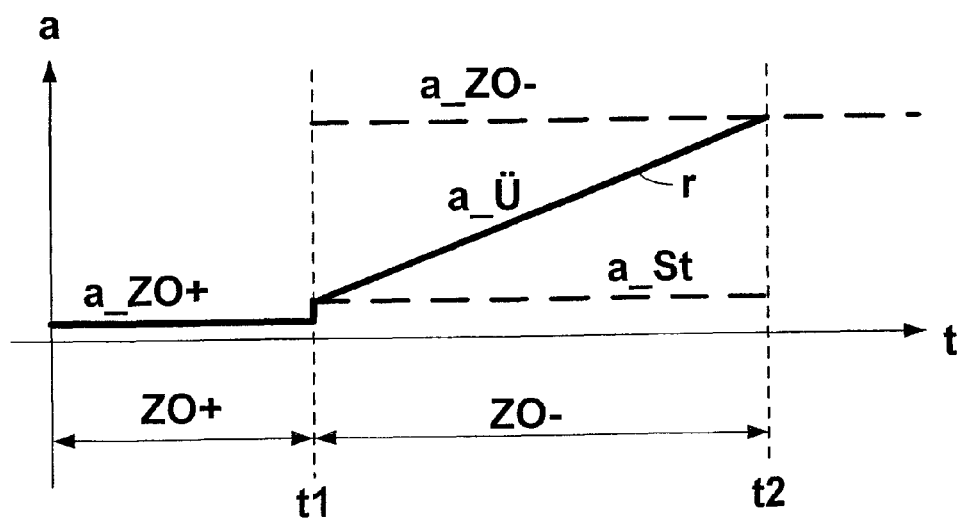
FIG. 2 shows a transition acceleration value set as a function of the probability of the target object loss, within the speed-dependent time interval.

FIG. 2 shows the acceleration a of the motor vehicle for the various modes of the distance-related longitudinal control system described. For purposes of simplification, all the acceleration values are assumed to be constant. As long as the motor vehicle is in a following drive operation, i.e. a target object is detected, for longitudinal control, a following drive acceleration value a_ZO+ is set for reaching or maintaining a preset distance from a vehicle ahead. If a target object loss is then detected at time t1, the control, maintaining the set distance, is interrupted. The distance-related longitudinal control system then determines a clear drive acceleration value a_ZO−, which would be set to reach the preset speed if the distance-related longitudinal control system had only been activated at time t1 and there was no target object in front of the motor vehicle. Furthermore, a start acceleration value a_St is determined or set which can be dependent on various parameters or operating conditions of the motor vehicle, preferably on the speed of the motor vehicle at the time of the target object loss. The start acceleration value can be recorded, for example in a performance map.

The distance-related longitudinal control system then determines within the speed-dependent time interval from t1 to t2 a transition acceleration value a_Ü, which is set for longitudinal control within this time interval from t1 to t2. The transition acceleration value a_Ü is determined within the time interval from t1 to t2, as a function of the determined target object loss probability WK from FIG. 1. The interrelationship between the transition acceleration value a_Ü and the target object loss probability WK can be described by the following equation:

$$a\_Ü = a\_St + WK*(a\_ZO- - a\_St)$$

As mentioned above, a_ZO− is a clear drive acceleration value which would be set for the control if the distance-related longitudinal control system had been activated at the time t1 and at the same speed. The start acceleration value a_St, may assume, as a value, either the following acceleration value a_ZO+ or a value between the following acceleration value a_ZO+ and the clear drive acceleration value a_ZO−.

Thus, a transition acceleration value a_Ü is produced within the speed-dependent time interval from t1 to t2, such that the value increases continuously from the start acceleration value a_St until the clear drive acceleration value a_ZO− is reached at time t2. As soon as the time t2 has been reached, a conventional longitudinal control operation is performed by setting the clear drive acceleration value a_ZO−, until a target object is again detected.

Alternatively, for a predetermined time, the transition acceleration value a_Ü can also correspond to the start acceleration value a_St, and only then can the continuous transition take place from the start acceleration value a_St to the clear drive acceleration value a_ZO−.

Therefore, the invention proceeds from the fact that in the event of clear drive operation, i.e. during a drive when no target object is detected, the distance-related longitudinal control system sets a clear drive acceleration value for reaching or maintaining a preset speed. If a vehicle ahead, detected as a target object, is located in front of the motor vehicle, i.e. the motor vehicle is in a following situation, a follow drive acceleration value is set to reach or maintain a preset distance from the target object. The term "acceleration value" can be understood to mean positive or negative accelerations in each case.

If during following drive operation, the loss of the target object is detected, a transition acceleration value is set. According to the invention the transition acceleration value is determined for the duration of a time interval which is dependent on the speed at the time of the loss of the target object. In this respect, the longer the time interval within certain limits the slower the speed at the time of the loss of the target object. If, within the speed-dependent time interval, a target object is again detected, the determined follow drive acceleration value is again immediately set. Accordingly, at the end of the time interval, the clear drive acceleration value is set in a known manner, as long as a target object is not detected.

The invention proceeds from the fact that in the event of clear drive operation, i.e. during a drive when no target object is detected, the distance-related longitudinal control system sets a clear drive acceleration value a_ZO− for reaching or maintaining a preset speed. If a vehicle ahead, detected as a target object, is located in front of the motor vehicle, i.e. the motor vehicle is in a following situation, a follow drive acceleration value a_ZO+ is set to reach or maintain a preset distance from the target object. The term "acceleration value" can be understood to mean positive or negative accelerations in each case.

If during following drive operation, the loss of the target object is detected at t1, a transition acceleration value a_Ü is set. The invention provides that the transition acceleration value a_Ü is determined for the duration of a time interval (time interval from t1 to t2), which is dependent on the speed at the time of the loss of the target object. In this respect, the longer the time interval (time interval from t1 to t2), within certain limits, the slower the speed at the time of target object loss. If, within the speed-dependent time interval, a target object is again detected, the determined follow drive acceleration value a_ZO+ is again immediately set. Accordingly, at the end of the time interval, the clear drive acceleration value a_ZO− is set in a known manner, as long as a target object is not detected.

If, during stop-and-go operation, the motor vehicle is in follow control type of operation, the distance from the vehicle ahead is usually very short. If a loss of target object is then detected, for example due to a sensor error, although the target object is still there, immediate acceleration of the motor vehicle with a clear drive acceleration value a_ZO− would result in a very rapid approach to the vehicle ahead. In the worst case scenario, a collision with the target object ahead would occur. The invention affords the advantage that a transition acceleration value a_Ü can be determined and set even at low speeds for a relatively long time. Thus, the use of the method is particularly advantageous at low speeds, which occur in stop-and-go traffic.

The transition acceleration value a_Ü is advantageously determined and set within the time interval (time interval from t1 to t2) as a function of the time (duration) after the loss of the target object and of the difference between the clear drive acceleration value a_ZO− and a start acceleration value a_St. The clear drive acceleration value a_ZO− is the acceleration value which would be determined or set if, for example the desired speed were increased or if the distance-related longitudinal control system had only been activated at this time and at this speed. The start acceleration value a_St can be the following drive acceleration value a_ZO+, which was last determined, or a transition acceleration value a_Ü that is between the following acceleration value a_ZO+ and the clear drive acceleration value a_ZO−, and can be dependent on the vehicle speed at the time of the loss of the target object (t1).

In one embodiment of the invention, the transition acceleration value a_Ü is determined or set as a function of the time (duration) after the loss of the target object, such that the transition acceleration value a_Ü changes continuously within the speed-dependent time interval function from a start acceleration value a_St to the clear drive acceleration value a_ZO−. The transition acceleration value a_Ü then increases over time continuously from the start acceleration value a_St to the clear drive acceleration value a_ZO−, at the end of the speed-dependent time interval.

In another embodiment of the invention, the transition acceleration value a_Ü can also be determined as a function of the time (duration) after the loss of the target object, such that for a predetermined time after the loss of the target object, a start acceleration value a_St is set and then the transition acceleration value a_Ü is changed continuously during the time interval. (after the start acceleration value has been set up) to the end of the time interval, according to a ramp from the start acceleration value a_St to the clear drive acceleration value a_ZO−. This embodiment differs from the previous embodiment only in that the transition acceleration value a_Ü corresponds for a predetermined time to the start acceleration value a_St, and only then does the start acceleration value a_St adapt to the clear drive acceleration value a_ZO−.

As a function of the time (duration) after the loss of the target object and the actual speed, a target object loss probability WK can advantageously also be determined, which increases as the time interval between the time of the loss of the target object and the actual time after the loss of the target loss increases, notably if no target object is present. In this respect, the target object loss probability WK is an indication of the probability of the target object no longer actually being present because, for example it has turned, veered around a bend, or has changed lane. A probability, indicating the likelihood that a target object is still present, can also be determined, although the loss of the target object has been detected. This probability would thus be the reciprocal of the target object loss probability WK.

The transition acceleration theoretical value a_Ü can then be determined, while incorporating the target object loss probability WK that has been determined, by multiplying the target object loss probability WK with the difference between the start acceleration value a_St and the clear drive acceleration value a_ZO−, and by subsequently adding with the start acceleration value a_St. This sets a transition acceleration value a_Ü, which is optimum in respect of a possible measuring error.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A method for controlling speed or distance or both speed and distance in motor vehicles having a distance-related longitudinal control system, comprising the steps of:
    setting a clear drive acceleration value with the distance-related longitudinal control systems for reaching a preset speed during clear driving;
    setting a follow drive acceleration value with the distance-related longitudinal control systems for maintaining a preset distance from a target object during follow drive operation of the target object;
    setting a transition acceleration value with the distance-related longitudinal control systems if the target object is lost during follow drive operation;
    determining a target object loss probability through a microprocessor, the probability being a function of time after the target object loss and actual speed at a time of the target object loss;
    wherein the transition acceleration value is set for a duration of a time interval and is dependent on a speed at the time of the target object loss.

2. The method according to claim 1, wherein the time interval is longer, the slower the speed at the time of the target object loss.

3. The method according to claim 2, wherein the transition acceleration value is set as a function of the time after the target object loss and the difference between the clear drive acceleration value and a start acceleration value.

4. The method according to claim 3, wherein the transition acceleration value is determined as a function of the time after the target object loss such that the transition acceleration value changes continuously within the time interval, according to a ramp function from a start acceleration value to the clear drive acceleration value.

5. The method according to claim 4, wherein the start acceleration value is the follow drive acceleration value or an intermediate acceleration value between the follow drive acceleration value and the clear drive acceleration value.

6. The method according to claim 3, wherein the transition acceleration value is determined as a function of the time after the target object loss such that the transition acceleration value corresponds for a predetermined time to a start acceleration value and the transition acceleration value then changes continuously up to the end of the speed-dependent time interval according to a ramp function from the start acceleration value to the clear drive acceleration value.

7. The method according to claim 6, wherein the start acceleration value is the follow drive acceleration value or an intermediate acceleration value between the follow drive acceleration value and the clear drive acceleration value.

8. The method according to claim 1, wherein the transition acceleration value is determined as a function of the time after the target object loss such that the transition acceleration value corresponds for a predetermined time to a start acceleration value and the transition acceleration value then changes continuously up to the end of the speed-dependent time interval according to a ramp function from the start acceleration value to the clear drive acceleration value.

9. The method according to claim 8, wherein the start acceleration value is the follow drive acceleration value or an intermediate acceleration value between the follow drive acceleration value and the clear drive acceleration value.

10. The method according to claim 1, wherein the probability advantageously increases as the time interval increases between a time of the target object loss and an actual time after the target object loss.

11. The method according to claim 10, wherein the transition acceleration value is determined by adding the start acceleration value to a value formed by multiplying the target object loss probability with the difference between a start acceleration value and the clear drive acceleration value.

12. The method according to claim 1, wherein a transition acceleration theoretical value is formed as a function of the target object loss probability.

13. The method according to claim 1, wherein the transition acceleration value is determined by adding a start acceleration value to a value formed by multiplying the target object loss probability with the difference between the start acceleration value and the clear drive acceleration value.

* * * * *